(12) United States Patent
Mayran De Chamisso et al.

(10) Patent No.: US 10,753,755 B2
(45) Date of Patent: Aug. 25, 2020

(54) METHOD, COMPUTER PROGRAM AND SYSTEM FOR CONTROLLING A MOVEMENT OF A MOVING AGENT WITHIN A NETWORKED ENVIRONMENT

(71) Applicant: Commissariat a l'energie atomique et aux energies alternatives, Paris (FR)

(72) Inventors: Fabrice Mayran De Chamisso, Nemours (FR); Michael Aupetit, Puteaux (FR); Laurent Soulier, Antony (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 313 days.

(21) Appl. No.: 15/566,931

(22) PCT Filed: May 3, 2016

(86) PCT No.: PCT/FR2016/051039
§ 371 (c)(1),
(2) Date: Oct. 16, 2017

(87) PCT Pub. No.: WO2016/177963
PCT Pub. Date: Nov. 10, 2016

(65) Prior Publication Data
US 2018/0106628 A1 Apr. 19, 2018

(30) Foreign Application Priority Data
May 4, 2015 (FR) ...................................... 15 53991

(51) Int. Cl.
*G01C 21/34* (2006.01)
*G05D 1/02* (2020.01)
(Continued)

(52) U.S. Cl.
CPC ....... *G01C 21/3446* (2013.01); *G05D 1/0217* (2013.01); *G05D 1/0274* (2013.01);
(Continued)

(58) Field of Classification Search
CPC ............. G01C 21/3446; G05D 1/0217; G05D 1/0274; G06Q 10/047; Y10S 901/01; B25J 9/1664
See application file for complete search history.

(56) References Cited

U.S. PATENT DOCUMENTS

| | | | |
|---|---|---|---|
| 6,934,615 B2 * | 8/2005 | Flann | A01B 69/008 172/2 |
| 8,392,455 B2 * | 3/2013 | Schmidt | G06Q 10/04 706/47 |

(Continued)

OTHER PUBLICATIONS

International Search Report dated Sep. 12, 2016 in PCT/FR2016/051039 filed May 3, 2016.
(Continued)

*Primary Examiner* — Jason Holloway
(74) *Attorney, Agent, or Firm* — Oblon, McClelland, Maier & Neustadt, L.L.P.

(57) ABSTRACT

A method controlling movement of an agent moving within an environment represented by a directed graph including vertices located at a border of an unknown portion of the environment, includes: guiding the moving agent via execution of at least one iteration of following successive operations: planning a path towards a destination vertex or border vertex, via a progressively increasing evaluation of a first heuristic of cost; controlling navigation of the agent towards the destination or border vertex returned by the planning; controlling an exploration in the unknown portion if the planning returns a border vertex as the destination. The planning includes, for each calculation of the first cost heuristic for a border vertex, calculation of a second heu-
(Continued)

ristic of risk. The method provides, as the destination, the border vertex with lowest calculated heuristic risk evaluation as soon as the cost exceeds this heuristic risk evaluation before reaching the destination vertex.

12 Claims, 6 Drawing Sheets

(51) Int. Cl.
 *G06Q 10/04* (2012.01)
 *B25J 9/16* (2006.01)
(52) U.S. Cl.
 CPC ........... *G06Q 10/047* (2013.01); *B25J 9/1664* (2013.01); *Y10S 901/01* (2013.01)

(56) References Cited

U.S. PATENT DOCUMENTS

| | | | | |
|---|---|---|---|---|
| 9,008,840 | B1* | 4/2015 | Ponulak | B25J 9/163 700/250 |
| 9,460,053 | B2* | 10/2016 | Schmidt | G06F 17/11 |
| 2010/0174435 | A1* | 7/2010 | Lim | G05D 1/0217 701/25 |
| 2011/0004625 | A1* | 1/2011 | Schmidt | G06F 17/11 707/776 |
| 2017/0190052 | A1* | 7/2017 | Jaekel | B25J 9/1671 |

OTHER PUBLICATIONS

De Chamisso, F.M. et al., "Exploratory digraph navigation using A*," International Joint Conference on Artificial Intelligence (IJCAI), vol. 2015—Jan. 2015, XP002755855, (Abstract, 1 pg.).

De Chamisso, Fabrice Mayran et al., "Exploratory Digraph Navigation Using A*," Proceedings of the 24th International Joint Conference on Artificial Intelligence (IJCAI 2015), Jul. 2015, XP055260508, pp. 1624-1630.

Argamon-Engelson, Shlomo et al., "Interleaved vs. A Priori Exploration for Repeated Navigation in a Partially-Known Graph*," International Journal of Pattern Recognition and Artificial Intelligence (IJPRAI), World Scientific Publishing, SI, vol. 13, No. 7, Nov. 1999, XP000873357, 24 pages.

Gifford, Kevin K. et al., "Incorporating Terrain Uncertainties in Autonomous Vehicle Path Planning," Proceedings of the 1996 IEEE/RSJ International Conference on Robots and Systems (IROS), Robotic Intelligence Interacting with Synamic Worlds, Osaka, Nov. 1996, XP000774017, pp. 1134-1140.

Feiner, Ariel et al., "PHA*: Finding the Shortest Path with A* in an Unknown Physical Environment," Journal of Artificial Intelligence Research, vol. 21, Jan. 2004, XP055260350, pp. 631-670.

Koenig, Sven et al., "Fast Replanning for Navigation in Unknown Terrain," IEEE Transactions on Robotics, vol. 21, No. 3, Jun. 2005, pp. 354-363.

Argamon-Engelson, Shlomo et al., "Utility-based On-Line Exploration for Repeated Navigation in an Embedded Graph," Artificial Intelligence, vol. 101, No. 1-2, May 1998, pp. 267-284 (Submitting Elsevier Pre-print, Feb. 9, 1998, pp. 1-21).

* cited by examiner

METHOD, COMPUTER PROGRAM AND SYSTEM FOR CONTROLLING A MOVEMENT OF A MOVING AGENT WITHIN A NETWORKED ENVIRONMENT

The present invention relates to a method for controlling a movement of an agent moving within an environment organized into a network of nodes and links between the nodes in order to guide the moving agent between a starting point and a destination point in this network.

It applies in particular for the control of an automaton, for example a robot, physically moving in a two- or three-dimensional environment in which the most efficient path possible, according to a freely chosen cost function, is sought between the starting point and the destination point.

It also applies for the transmission of a packet of digital data in a data transmission network, between an emitter and a recipient of this packet of data.

It also applies for the transmission of a request in a semantic database, between an emitter and a recipient of this request.

A well-known, fundamental method for solving this type of problem, according to which an optimal path is sought in a network, is the implementation of Dijkstra's algorithm when the cost of crossing any link between two nodes of the network is known. Another known method, which optimizes Dijkstra's algorithm when the direction of the destination point from the starting point is also known, is the implementation of the A* algorithm (or D* for a "dynamic" version of A*). These algorithms are efficient and optimal, but only when the network in its totality can be represented by a directed graph. This is the case when all the nodes and links of the network are known, that is to say, that they have already been explored and have not changed, and when furthermore, the network has a reasonable size such that all the parameters relating to its nodes and links can be stored. When the costs of crossing certain links change, although the nodes remain known in their totality, there are solutions such as the solution called "D* Lite" proposed in the article by Koenig et al, entitled "Fast replanning for navigation in unknown terrain," published in IEEE Transactions on Robotics, vol. 21, No. 3, pages 354-363, in June 2005.

However, there are numerous real cases in which it can be desired to control the movement of an agent moving within an environment organized into a network of nodes and links between the nodes partially represented by a directed graph, each vertex and edge of the directed graph corresponding respectively to a node and to an orientation of a link of the network, the directed graph initially comprising a plurality of vertices, called "border vertices", from each of which at least one edge is directed towards an unknown portion of the network not represented by the directed graph. In these numerous cases in which the network is not totally known, Dijkstra's algorithm and the A* (or D*) algorithm are not optimal because they only propose path planning in the known portion of the network, followed by navigation according to this plan, without a phase of exploring the unknown portion of the network. Also in these cases, the D* Lite solution may not work when, in addition to certain links, some nodes of the network can be unknown.

In these cases, methods combining planning, navigation and exploration of the environment in which the moving agent moves are better suited.

For example, the article by Argamon-Engelson et al, entitled "Utility-based on-line exploration for repeated navigation in an embedded graph", published in Artificial Intelligence, vol. 101, No. 1-2, pages 267-284 in May 1998, proposes a tradeoff between planning/navigation and exploration in an incomplete directed graph. But this solution, called "EWP" by its authors, requires multiple there-and-back journeys between the starting vertex and the destination vertex for an incremental search for the optimal path. It is costly and is only of interest when a path must be optimized in order to be taken a large number of times. Moreover, this solution does not take advantage of a methodology via heuristic evaluation in its progressive search for a path during the planning phase, which is where all the interest of the algorithms such as A*, D* and D* Lite lies. Indeed, an overall heuristic evaluation is considered, but not during the progressive crossing of the graph. Moreover, the EWP solution does not clearly indicate which method is used during this crossing of the graph and assumes that all the possible shortcuts using the unknown portion are nonetheless known in advance, with only their cost remaining unknown. Finally, the exploratory phase of this solution requires a destination to be provided in advance, for example a border vertex other than the one from which the exploration starts, without it being planned to stop earlier if another known vertex of the graph is encountered in the meantime.

The invention applies more particularly to a method of the aforementioned type, when the network is only partially represented by a directed graph, comprising guiding of the moving agent in its movement, between a starting vertex and a destination vertex in the directed graph, via execution of at least one iteration of the following successive steps:

planning of a path in the directed graph, between a vertex at which the moving agent is located and the destination vertex or a border vertex, via execution of a path-searching algorithm on the basis of a first heuristic evaluation of cost calculated for vertices of the directed graph and on the basis of a path search via a progressive increase in the cost, controlling a navigation of the moving agent between the location at which it is located and the destination vertex or the border vertex returned by the planning step, and after the navigation and if the planning step returns a border vertex that is different from the destination vertex, controlling an exploration in the unknown portion of the network with enrichment of the directed graph via the addition of the vertex or vertices and edge(s) explored.

Such a method, called PHA* by its authors, is disclosed in the article by Felner et al, entitled "PHA*: finding the shortest path with A* in an unknown physical environment," published in Journal of Artificial Intelligence Research, vol. 21, pages 631-670 in June 2004.

But here again, the solution proposed is costly in terms of navigation of the moving agent in its environment, because priority is given to the exploration of the unknown portions of the network as soon as a border vertex is encountered during planning, in order to find an optimal path between the starting vertex and the destination vertex, regardless of the exploratory cost thereof. For that matter, the exploratory phase continues, even when the destination vertex is possibly reached, as long as the optimal path has not definitively been found. This solution, even if it advantageously uses a methodology via heuristic evaluation in its progressive search for a path during the planning phase, in particular the algorithm A*, thus remains of interest only if the optimal path found is intended to be later taken a large number of times.

It can thus be desired to provide a method for controlling a movement of a moving agent that allows at least part of the aforementioned problems and constraints to be overcome.

A method is thus proposed for controlling a movement of an agent moving within an environment organized into a network of nodes and links between the nodes partially represented by a directed graph, each vertex and edge of the directed graph corresponding respectively to a node and to an orientation of a link of the network, the directed graph initially comprising a plurality of vertices, called "border vertices", from each of which at least one edge is directed towards an unknown portion of the network not represented by the directed graph, the method comprising guiding of the moving agent in its movement, between a starting vertex and a destination vertex in the directed graph, via execution of at least one iteration of the following successive steps:

planning a path in the directed graph, between a vertex at which the moving agent is located and the destination vertex or a border vertex, via execution of a path-searching algorithm on the basis of a first heuristic evaluation of cost calculated for vertices of the directed graph and on the basis of a path search via a progressive increase in the cost, controlling a navigation of the moving agent between the location at which it is located and the destination vertex or the border vertex returned by the planning step, and after the navigation and if the planning step returns a border vertex that is different from the destination vertex, controlling an exploration in the unknown portion of the network with enrichment of the directed graph via the addition of the vertex or vertices and edge(s) explored, wherein the planning step of each iteration comprises, for each calculation of the first heuristic evaluation of cost for a border vertex, an additional calculation of a second heuristic evaluation of risk for this border vertex, and provides, as the destination of the path, the border vertex for which the heuristic evaluation of risk calculated is the lowest as soon as the cost exceeds this lowest heuristic evaluation of risk before the destination vertex has been reached.

Thus, while taking advantage of a method for planning via heuristic evaluation, it is possible, thanks to the invention, and more precisely via the additional calculation of a heuristic evaluation of risk in addition to the heuristic evaluation of cost as may be proposed by algorithms such as A*, to introduce, into this planning, a notion of risk in carrying out an exploration during navigation and to automatically process the tradeoff between continuing the navigation in known terrain or exploring in an unknown zone. Thus, it is possible to start a planned exploratory navigation while preserving the control of the cost in terms of navigation in order to guide the moving agent from its starting vertex to its destination vertex as efficiently as possible.

Optionally, the planning step of each iteration is executed on the basis of an implementation of the A* algorithm in which the first heuristic evaluation of cost is defined, for each considered vertex of the directed graph for which said evaluation is calculated, as the sum of a minimum cost for going from the vertex at which the moving agent is located to the considered vertex by navigating in the directed graph and a heuristic estimation of minimum cost for going from the considered vertex to the destination vertex.

Also optionally, the heuristic estimation of minimum cost is a distance expressed via the Euclidean norm between the considered vertex and the destination vertex.

Also optionally, the second heuristic evaluation of risk is defined, for each considered border vertex of the directed graph for which said evaluation is calculated, as the sum of a minimum cost for going from the vertex at which the moving agent is located to the considered border vertex by navigating in the directed graph and a heuristic estimation of overestimated cost for going from the considered border vertex to the destination vertex.

Also optionally, the heuristic estimation of overestimated cost corresponds to the heuristic estimation of minimum cost weighted by a multiplication coefficient greater than or equal to "1".

Also optionally, the multiplication coefficient is variable during navigation or between two steps of navigations.

Also optionally, the heuristic estimation of overestimated cost is further weighted by an additional multiplication coefficient defined on the basis of an angular value expressed with respect to the reference direction of an axis connecting the considered border vertex to the destination vertex, with this additional multiplication coefficient being more specifically defined in such a way as to penalize any navigation in a direction that moves away from the reference direction.

Also optionally, at least one semantic rule defined according to the application needs is introduced into the second heuristic evaluation of risk.

Also optionally, the exploration step of each iteration is carried out until any vertex of the directed graph is again reached.

Also optionally, said successive steps are repeated until the destination vertex is reached or the planning step is blocked at the vertex at which the moving agent is located.

A computer program is also proposed that can be downloaded from a communication network and/or is recorded on a medium readable by a computer and/or can be run by a processor, and that comprises instructions for executing the steps of a method for controlling a movement of a moving agent according to the invention, when said program is run by a processor.

A system is also proposed for controlling a movement of an agent moving within an environment organized into a network of nodes and links between the nodes partially represented by a directed graph, each vertex and edge of the directed graph corresponding respectively to a node and to an orientation of a link of the network, the directed graph initially comprising a plurality of vertices, called "border vertices", from each of which at least one edge is directed towards an unknown portion of the network not represented by the directed graph, the system comprising a guide processor programmed for executing the steps of a method for controlling a movement of a moving agent according to the invention.

The invention will be better understood via the following description, given only as an example and with reference to the appended drawings in which.

Figure 1:
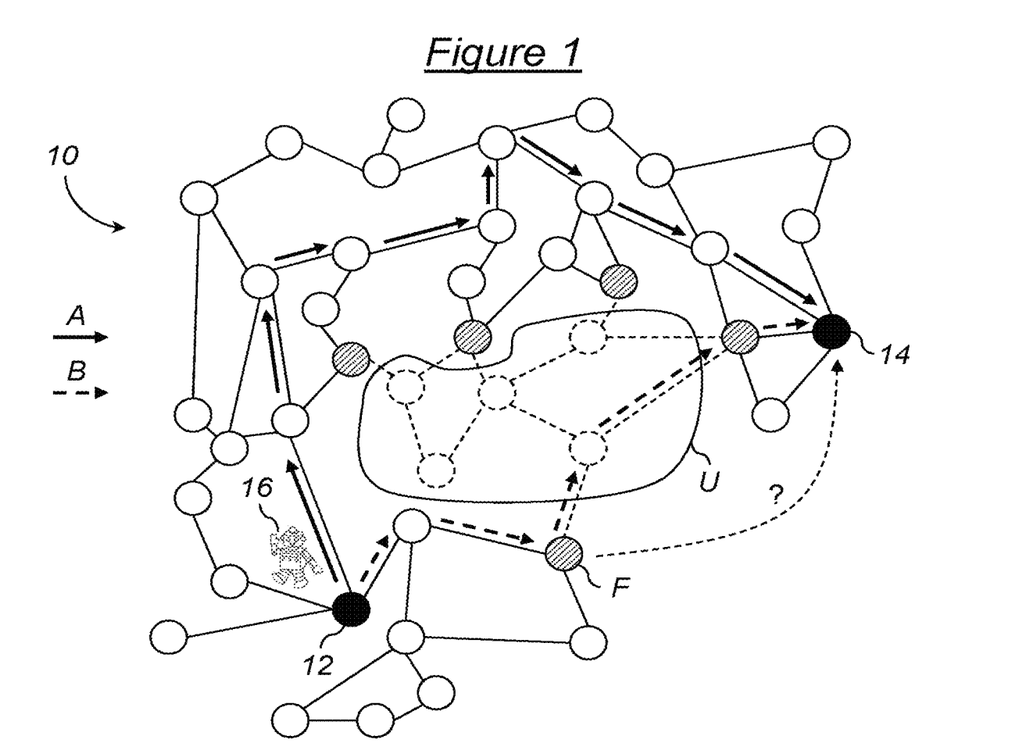
FIG. 1 schematically shows an example of an environment organized into a network of nodes and links between these nodes partially represented by a directed graph, FIG. 2 schematically shows the general structure of a system for controlling a movement of a moving agent, according to an embodiment of the invention.

The environment shown in FIG. 1 is an example of an environment organized into a network 10 of nodes and links between the nodes partially represented by a directed graph. It should be noted that this network 10 is quite ordinary, whether in terms of the arrangement of the nodes with respect to each other or the number of links per node. For example, although this is not illustrated in FIG. 1, links of the network 10 could intersect. In a certain number of rather widespread applications, the network 10 could be organized into a regular matrix of pixels connected to each other via a neighborhood of eight neighboring pixels per pixel.

A portion of the network 10 is known, for example because it was the subject of a previous exploration, and is shown by solid lines, both for the nodes, which correspond to the vertices of the directed graph, and for the links, which correspond to the edges of the directed graph. More specifically, each known bidirectional link of the network 10 can potentially be represented by two edges of the directed graph, one oriented in one direction and the other in the opposite direction. Each edge of the graph is associated with a crossing cost.

Another portion of the network 10, labeled U and not shown by the directed graph, is unknown. It is shown by dotted lines, both for the nodes and for the links, to which nothing in the directed graph corresponds.

A portion of the vertices of the directed graph, hatched in FIG. 1, have a particular status. These are the vertices from each of which at least one edge is directed towards or comes from the unknown portion U of the network 10 and is thus itself unknown. Each of these vertices will be qualified hereinafter as a "border vertex".

Finally, two vertices of the directed graph, in black in FIG. 1, represent a starting vertex 12 and a destination vertex 14, respectively, relative to the movement of a moving agent 16 in the environment organized into a network 10.

According to the known methods for planning and navigation without exploration, such as Dijkstra's algorithm or the A* or D* algorithm, an optimal path A would be sought in the known portion of the network 10, that is to say, the portion represented by the directed graph. Said path is illustrated by solid arrows in FIG. 1. For that matter, it should be noted that, although this is not illustrated in FIG. 1, the directed graph partially representing the network 10 could comprise directed sub-graphs not connected to each other. In particular, the starting vertex 12 and the destination vertex 14 could be part of non-connected sub-graphs in such a way that a path A could not be found by carrying out a search only in the known portion of the network 10.

Figure 2:
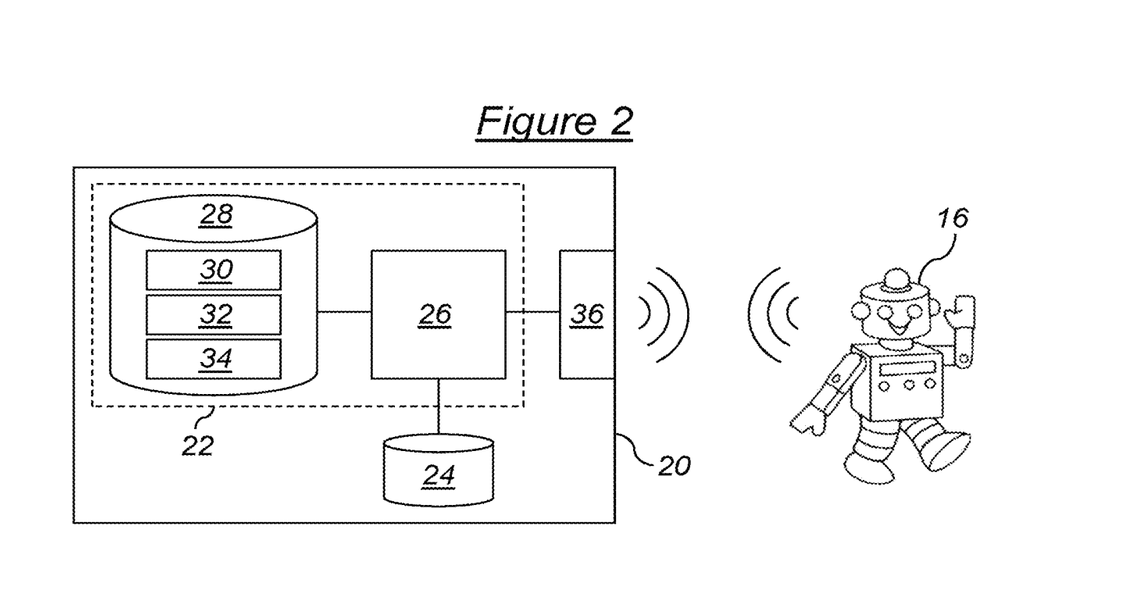
Figure 3:
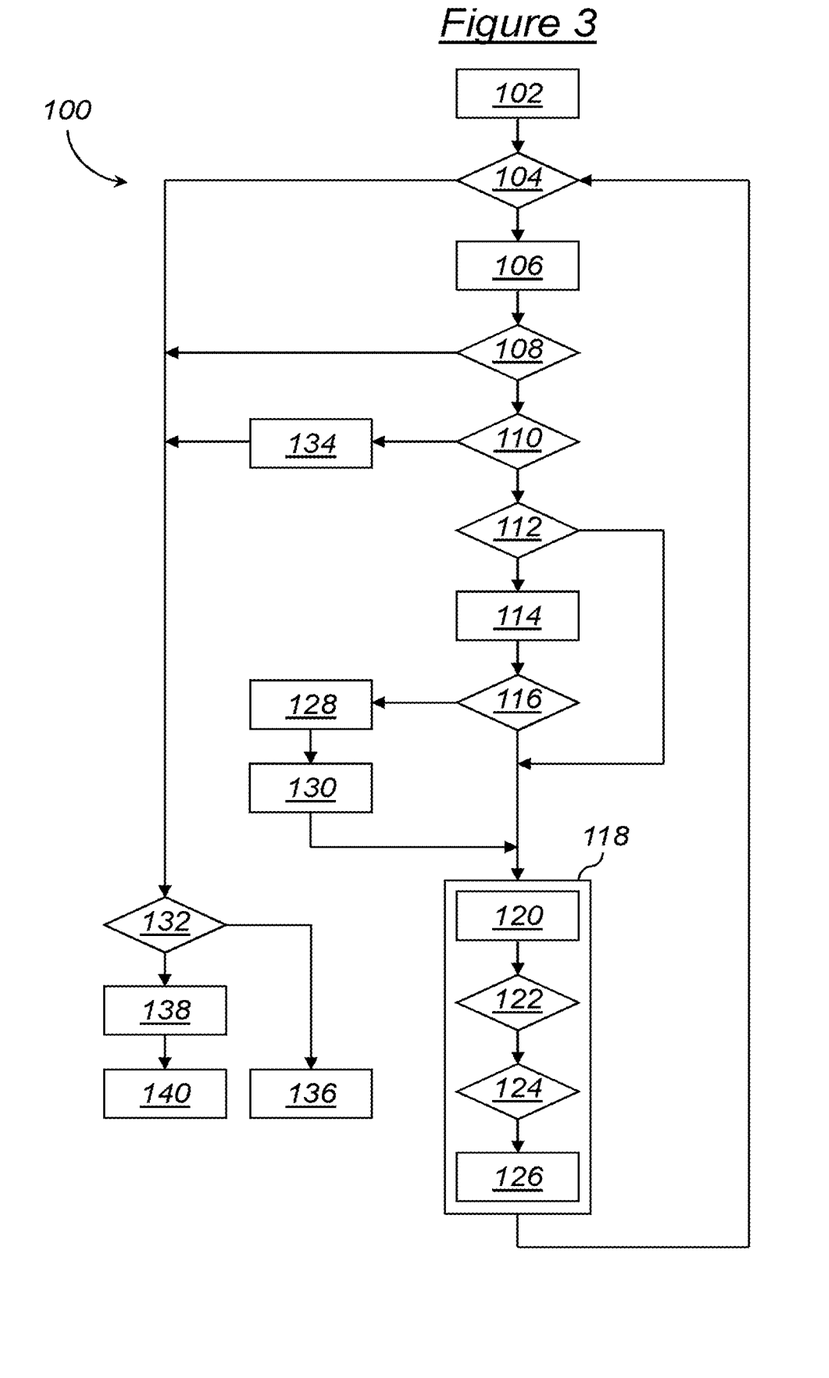
FIGS. 3 and 4 illustrate the successive steps of a method implemented by the system of FIG. 1, according to an embodiment of the invention.
Figure 4:
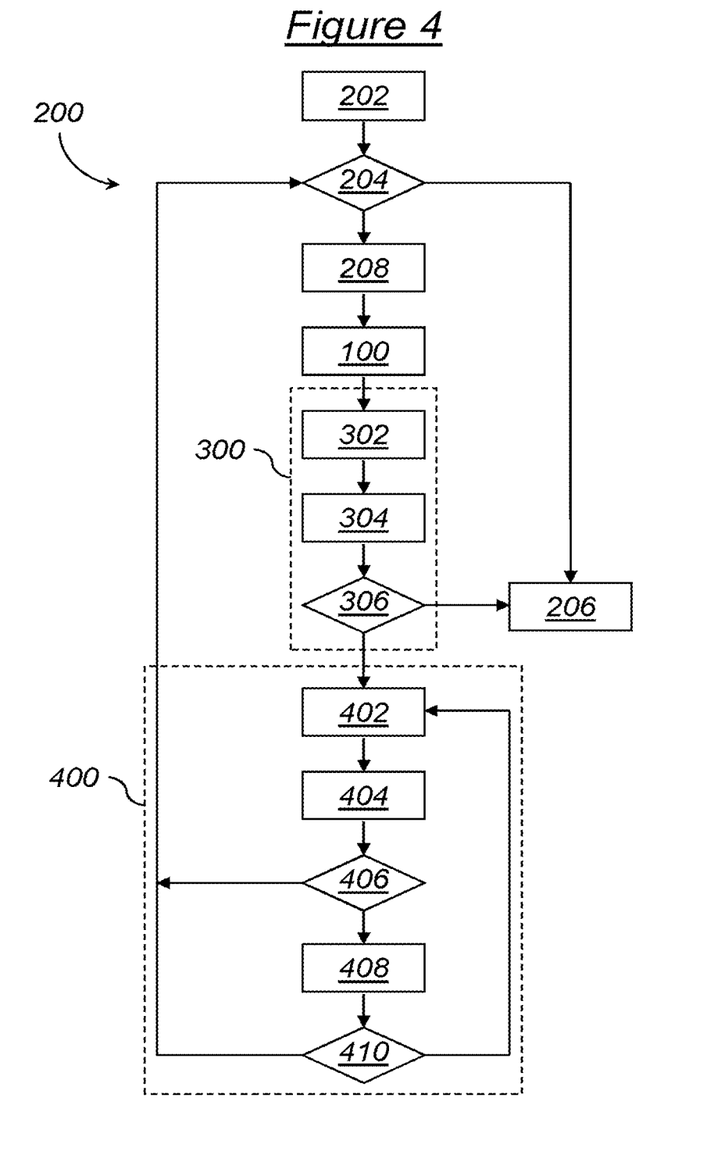

According to a system/method for controlling a movement of the moving agent 16 via planning and exploratory navigation according to the invention such as that which will be detailed in references to FIGS. 2 to 4, a path B that is of greater interest because it is less costly than the path A can be found, via a passage through the unknown portion U, by exploration starting from one (labeled F) of the border vertices. It is illustrated by dotted arrows in FIG. 1. In particular, in the non-illustrated case in which the starting vertex 12 and the destination vertex 14, although accessible to each other in the network 10, are initially part of non-connected sub-graphs, a system/method for controlling a movement of the moving agent 16 according to the invention allows a path to be found necessarily via at least one exploratory phase.

The system 20 for controlling the movement of the moving agent 16 as schematically shown in FIG. 2 comprises a processing unit 22 associated in a conventional way with a memory 24 (for example a RAM memory). This memory 24 stores, for example, namely the parameters allowing the directed graph that partially represents the network 10 to be defined.

The processing unit 22 can be implemented in a computer device such as a conventional computer comprising a processor associated with one or more memories for the storage of data files and computer programs. The processing unit 22 can thus itself be considered to be formed by a processor 26 for guiding the moving agent 16, associated with a memory 28 for storing the instructions that it executes in the form of computer programs.

Among these computer programs, a first program 30 is for example designed for the execution of path planning according to the method steps that will be detailed in reference to FIG. 3, a second program 32 is designed for the execution of navigation according to the method steps that will be detailed in reference to FIG. 4, and a third program 34 is designed for the execution of exploration according to these same method steps of FIG. 4.

The processing unit 22 as illustrated in FIG. 2 thus functionally comprises three computer programs or three functions of the same computer program. It should indeed be noted that the computer programs 30, 32 and 34 are shown as being distinct, but this distinction is purely functional. They could also be grouped together according to all the possible combinations into one or more pieces of software. Their functions could also be at least partly microprogrammed or microwired into dedicated integrated circuits. Thus, alternatively, the computer device implementing the processing unit 22 could be replaced by an electronic device consisting solely of digital circuits (without a computer program) for carrying out the same actions.

According to one possible alternative embodiment, the control system 20 is independent and remote from the moving agent 16. It thus comprises an interface 36 for telecommunication with this moving agent 16, managed by the guide processor 26.

According to another possible alternative embodiment, the control system 20 could be onboard the moving agent 16.

A method for controlling the movement of the moving agent 16 implemented by the system 20, for example in the environment illustrated in FIG. 1, from the starting vertex 12 to the destination vertex 14, will now be detailed. It comprises the guiding of the moving agent 16 via execution of at least one iteration of a succession of steps having a planning phase 100 and a navigation phase 300 optionally followed by an exploratory phase 400.

A non-limiting example of an embodiment of the planning phase 100 is illustrated in FIG. 3. It is based on an improvement of the A* algorithm and is carried out by the execution of the instructions of the computer program 30. During the execution of this planning phase 100 during an $n^{th}$ iteration, the moving agent 16 is located at some current vertex O(n) of the directed graph, more specifically the starting vertex 12 if this is the first iteration. The goal of the planning phase 100 of the $n^{th}$ iteration is to determine a destination vertex T(n) in the directed graph and a path for going there by following edges and vertices of the directed graph. This destination is either final, if it is the destination vertex 14, or intermediate, and in the latter case, it is one of the border vertices of the directed graph, as will be shown below.

In order to carry out this planning 100 of destination and path, a first heuristic evaluation of cost $\delta(X)$ is defined, for each considered vertex X of the directed graph for which said evaluation can be calculated, as a non-limiting example, as the sum of a minimum cost for going from the current vertex O(n) to the considered vertex X by navigating in the directed graph, this minimum cost being labeled as D[O(n), X], and a heuristic estimation of minimum cost for going from the considered vertex X to the destination vertex 14, labeled H(X). This first heuristic evaluation of cost $\delta(X)$ is in practice only calculated for certain vertices of the directed graph, those which are solicited on the basis of a path search via a progressive increase in the cost δ(X), as will be detailed below.

The minimum cost D[O(n),X] is for example that of an admissible path for going from O(n) to X, a path being defined as admissible if there is no shorter path in the directed graph in order to go from O(n) to X. In particular, D[O(n),X]=∞ if there is no path in the graph in order to go from O(n) to X.

According to the requirements of the A* algorithm, the heuristic estimation of minimum cost H(X) is also admissible, which means that it must never overestimate the navigation costs. A simple example for H(X) is to define it as a distance expressed using the Euclidean norm between the considered vertex X and the destination vertex 14 since no navigation cost can be less than such a distance that represents a navigation as the crow flies.

In order to carry out the planning of destination and path, a second heuristic evaluation of risk R(Z) is defined, but only for each considered border vertex Z of the directed graph for which said evaluation can be calculated, in general in such a way as to be greater than or equal to the first heuristic evaluation of cost in Z, i.e. δ(Z). It is for example more precisely defined, as a non-limiting example, as the sum of a minimum cost D[O(n),Z] for going from the current vertex O(n) to the considered border vertex Z by navigating in the directed graph and a heuristic estimation of overestimated cost for going from the considered border vertex Z to the destination vertex 14. This heuristic estimation of overestimated cost is labeled H'(Z). This second heuristic evaluation of risk R(Z) is in practice only calculated for certain border vertices of the directed graph, those that are solicited on the basis of the aforementioned path search via a progressive increase in the cost δ(X), as will be detailed below.

The minimum cost D[O(n),Z] is defined for Z in the same way as for any vertex X of the directed graph. As for the heuristic estimation of overestimated cost H'(Z), it can be defined on the basis of the heuristic estimation of minimum cost H(Z) with the application of at least one addition or multiplication risk coefficient such that it satisfies H'(Z)≥H(Z) in such a way as to satisfy the inequality R(Z)≥δ(Z). In particular, in the example of at least one multiplication risk coefficient, H'(Z) can be defined in the following way:

$$H'(Z)=\alpha \cdot (1-\beta \cdot \cos \theta) \cdot H(Z),$$

where α is a multiplication coefficient greater than or equal to "1" and (1−β·cos θ) is an additional multiplication coefficient defined on the basis of an angular value θ, expressed with respect to the reference direction of an axis connecting the considered border vertex Z to the destination vertex 14, and a weighting coefficient β less than or equal to "1".

Advantageously, the angular value θ, expresses the orientation of the edge leaving from the current border vertex Z closest to the reference direction and it is this edge that will preferably be chosen in order to start an exploration if the border vertex Z is retained as the destination of the planning phase. Thus, the multiplication coefficient (1−β·cos θ) is defined in such a way as to penalize any exploratory navigation in a direction that moves away from the reference direction.

It should be noted that the heuristic evaluation of risk R(Z) can be freely adapted in order to obey one or more higher level semantic rules that can be defined according to the application needs. For example, the multiplication coefficient α, or more generally the function R(Z), can vary during a navigation phase or between two navigation phases in such a way as to reduce (greater α) or increase (smaller α) the taking of risks, in particular according to exhaustible resources of the moving agent 16, or because it is decided to limit the taking of risks at each new iteration, etc. Likewise, if at least one point for recharging resources for the moving agent 16 is known, whether it is precisely identified in the known portion of the network 10 or supposed in the unknown portion U, it can be desired to adapt the heuristic evaluation of risk R(Z) in order to increase the incentive to pass through this recharge point. Likewise, a rule for self-evaluation of the exploratory strategy of the moving agent 16 can be added by measuring, for example in real time, the energy spent during exploratory navigation with respect to that which would have been spent during planning/navigation alone (in particular via simple execution of the A* algorithm), in such a way as to adapt the heuristic evaluation of risk R(Z), namely by influencing the value of the multiplication coefficient α, according to the performance obtained. Other semantic rules suitable for influencing the heuristic evaluation of risk R(Z), for example such as more or less precise knowledge of easiness or obstacles in the known and unknown portions, are possible and can be integrated into this heuristic evaluation of risk R(Z).

It should furthermore be noted that in general, the heuristic evaluation of risk R(Z) can be freely defined in such a way as to generally overestimate the sum δ(Z)=D[O(n),Z]+H(Z) and not necessarily H(Z) alone.

During a first step 102 of initializing the planning phase 100, the current vertex O(n) at which the moving agent 16 is located is placed in a priority queue, called open list and labeled Q, in association with its first heuristic evaluation of cost δ(O(n)). Another queue, called closed list and labeled S, is defined and initialized with an empty set. These two lists, open Q and closed S, correspond to those that are used in a well-known manner for the A* algorithm. The destination vertex T(n) is initialized indifferently with an empty set or with the current vertex O(n). Finally, an exploratory cost value labeled $R_{min}$ is initialized with an infinite value ∞.

During a subsequent step 104, the content of the open list Q is tested. If it is not empty, the processor 26 proceeds to a step 106 of removing one of the vertices from the open list Q in order to place it in the closed list S. The vertex X that is removed is the one, or one of the ones, that has the lowest cost δ(X).

Then, during a test step 108, the cost value δ(X) of the vertex X previously selected is compared to the exploratory cost value $R_{min}$. If the cost δ(X) is less than or equal to the exploratory cost $R_{min}$, the processor 26 proceeds to another test step 110.

During the test step 110, the vertex X selected is compared to the destination vertex 14. If X is different than the destination vertex 14, the processor 26 proceeds to another test step 112.

During the test step 112, it is determined whether the vertex X selected is a border vertex of the directed graph. If X is indeed a border vertex, the processor 26 proceeds to a step 114.

During this step 114, the risk heuristic R(X) is evaluated.

During a subsequent test step 116, the risk R(X) is compared to the exploratory cost $R_{min}$. If it is strictly greater than the exploratory cost $R_{min}$, the processor 26 proceeds directly to a loop 118 of steps 120, 122, 124, 126 executed for all the neighboring vertices T of the vertex X in the directed graph. Otherwise, the processor 26 proceeds to two successive update steps 128 and 130.

During step 128, the destination vertex T(n) becomes the border vertex X. During the step 130, the exploratory cost $R_{min}$ is updated to the value of R(X). The order of execution of the steps 128 and 130 is indifferent. They are followed by the loop 118 of steps 120, 122, 124, 126.

The processor 26 also proceeds directly to the loop 118 of steps 120, 122, 124, 126 if it is determined in the test step 112 that the vertex X selected is not a border vertex.

During the execution of the loop 118 of steps 120, 122, 124, 126, for each neighbor T of the vertex X in the directed graph:
- the cost heuristic δ(T) is evaluated (step 120),
- it is tested (step 122) whether the vertex T is already in the closed list S and whether or not the cost heuristic δ(T) evaluated in step 120 is greater than or equal to the cost associated with T in the closed list S,
- it is tested (step 124) whether the vertex T is already in the open list Q and whether or not the cost heuristic δ(T) evaluated in step 120 is greater than or equal to the cost associated with T in the open list Q, and
- if both tests 122 and 124 have a negative result, then T is inserted into the open list Q in association with the cost heuristic δ(T) evaluated in step 120.

At the end of the loop 118, the processor 26 returns to the test step 104.

If it is tested that the open list Q is empty during step 104, the processor 26 proceeds to a test step 132.

The processor 26 also proceeds to the test step 132 after step 108 if the cost δ(X) is strictly greater than the exploratory cost $R_{min}$.

The processor 26 also proceeds to the test step 132 after step 110, via an update step 134, if the vertex X is the destination vertex 14. In this case, the destination vertex T(n) becomes the destination vertex 14 and the exploratory cost $R_{min}$ is updated to the value of R(X) during this step 134.

The test step 132 involves determining whether the destination vertex T(n) has remained at its initialization value (i.e. the empty set or the current vertex O(n)).

If this is the case, the processor 26 proceeds to a step 136 of ending control of the movement of the moving agent 16. Arriving at this step 136 means that the planning is blocked at the vertex at which the moving agent 16 is located and that the destination vertex 14 is inaccessible or that the moving agent 16 is already at the destination vertex 14, the latter having been reached before the current iteration.

If this is not the case, the processor 26 proceeds to a step 138 during which a path is reconstructed from the destination vertex T(n) to the current vertex O(n). This step 138 corresponds to the teaching of the A* algorithm and is well known. It will not be explained in detail.

Then, during a final step 140, the processor 26 provides the destination vertex T(n) determined and the path for getting there by following edges and vertices of the directed graph. This information is necessary for starting the navigation phase 300.

It is clear that the planning phase 100 detailed above allows navigation to be planned between the vertex at which the moving agent 16 is located and:
- either the destination vertex 14 if the test step 132 is reached at the end of step 134, or after step 104 with the destination vertex T(n) equal to the destination vertex 14,
- or a border vertex if the test step 132 is reached after step 108, or after step 104 with the destination vertex T(n) equal to one of the border vertices of the directed graph.

In particular, steps 112 and 114 require that for each calculation of the heuristic evaluation of cost δ(X) carried out for a border vertex, an additional calculation of the heuristic evaluation of risk R(X) is carried out for this border vertex, and the test step 108 thus ensures, together with steps 116, 128 and 130, that the planning 100 returns, as the destination T(n), the border vertex for which the heuristic evaluation of risk R(X) calculated is the lowest ($R_{min}$) as soon as the cost δ(X) exceeds this lowest heuristic evaluation of risk $R_{min}$ before the destination vertex 14 is reached.

It is also clear that the planning phase 100 is based on a path search via a progressive increase in the cost δ(X) via the removal step 106 and the management of the open list Q and closed list S.

Finally, it is clear that this planning phase 100, based on an implementation of the A* algorithm, could also be based on another path-search algorithm via a progressive increase in a cost evaluated heuristically. In particular, if a heuristic estimation of minimum cost equal to zero is required in order to go from any vertex considered to the destination vertex 14, this bases the planning phase on an implementation of Dijkstra's algorithm.

Given how the planning phase 100 detailed above functions, the more general method, labeled 200, for controlling the movement of the moving agent 16 will now be described in reference to FIG. 4.

It comprises a first initialization step 202 during which the iteration index n is initialized to "1" and the current vertex O(n) is initialized to the starting vertex 12.

During a subsequent step 204, the current vertex O(n) is tested. If it corresponds to the destination vertex 14, then the processor 26 proceeds to a step 206 of ending control of the movement of the moving agent 16 since the latter has arrived at its destination. Otherwise, the processor 26 executes the steps of the planning phase 100, optionally after having previously adapted the heuristic evaluation of risk R(Z) during an optional step 208.

If the planning phase 100 ends at step 136, the method 200 thus ends while the moving agent 16 remains blocked without being able to reach the destination vertex 14 or while the moving agent 16 is already at the destination vertex 14, the latter having been reached before the current iteration. In particular, according to how the method 200 functions with its phases of planning 100, navigation 300 and exploration 400, if the destination vertex 14 is not reached in the end, this means that there is indeed no path from the starting vertex 12 to the destination vertex 14 in the network 10 and that all the nodes of the network 10 that can be reached from the starting vertex 12 have been explored.

If the planning phase 100 ends with step 140, after which the destination vertex T(n) and the path for getting there are provided, the processor 26 starts the navigation phase 300 via execution of the instructions of the computer program 32.

This navigation phase 300 comprises a step 302 of guiding the moving agent 16 through the directed graph from its current position O(n) to its destination T(n) by following the indicated path. The destination T(n) thus becomes the new current vertex O(n+1).

It then comprises a step 304 of incrementing the iteration index n of a unit, then a step 306 during which the current vertex O(n)←O(n+1) is tested. If it corresponds to the destination vertex 14, then the processor 26 proceeds to step 206.

Otherwise, this means that it corresponds to one of the border vertices from which an exploration is desired and the processor 26 starts the exploratory phase 400 via execution of the instructions of the computer program 34.

During a first step 402 of the exploratory phase, the moving agent 16 is guided along an edge of the unknown portion U of the network 10 to a new current vertex O(n+1) that is, a priori, also unknown. This edge is for example the best unknown edge for going to the destination vertex 14, selected according to its orientation that minimizes the angle θ as indicated above. It can also be chosen at random by default.

During a subsequent step 404, the new explored edge is added to the directed graph in such a way as to enrich it with the information obtained via this exploration. Once again, the iteration index n is incremented by one unit.

During a subsequent step 406, the new current vertex O(n)←O(n+1) is tested. If it already belongs to the directed graph, then the processor 26 returns to the test step 204 for an end of method or new planning. Otherwise, it proceeds to a step 408 during which the new current vertex is added to the directed graph in such a way as to enrich it with the information obtained via the exploration.

After step 408, the current vertex O(n) is again tested during a step 410. If this test reveals that the current vertex is not a border vertex, then, since it was just added to the directed graph, this means that it is a dead end. The processor 26 thus returns to the test step 204 for an end of method or new planning.

If, on the contrary, the test step 410 reveals that the current vertex O(n) is a border vertex, the processor 26 returns to the first step 402 of the exploratory phase. The exploration continues until any vertex of the directed graph, that is to say, a vertex that is already known, is again reached.

Figure 5A:
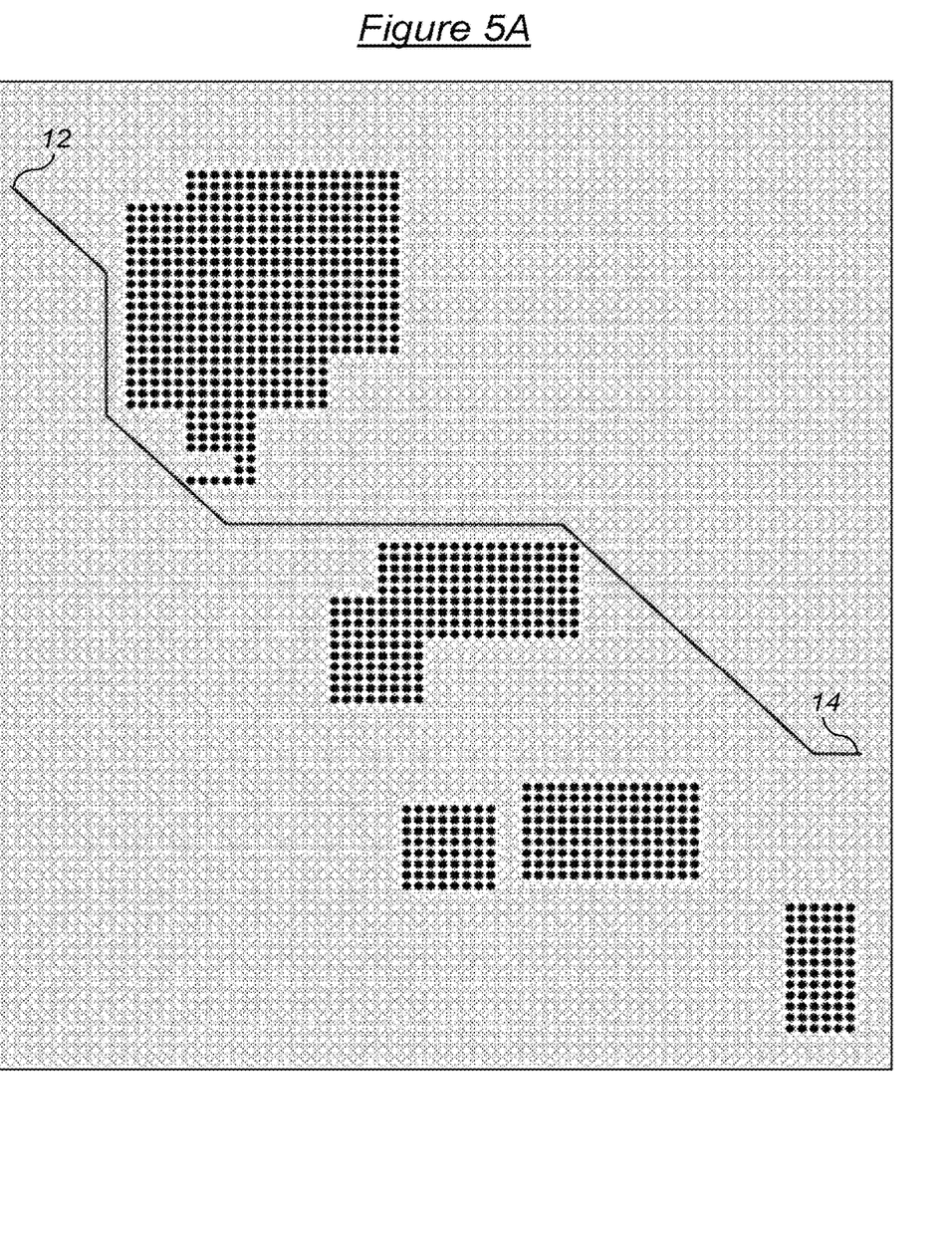
FIGS. 5A, 5B and 5C illustrate various results with or without use of the method of FIGS. 3 and 4, for the case of a path taken by an agent moving in an environment represented by a matrix of pixels.

FIG. 5A illustrates the result of the execution of a method for controlling the moving agent 16 according to the invention, such as that of FIGS. 3 and 4, in an environment organized into a matrix of pixels connected to each other via a neighborhood of eight neighboring pixels per pixel, this environment being moreover totally represented by a directed graph. The pixels that can be crossed are shown in light gray and those that form an obstacle are shown in black. In this particular case, the execution of a method according to the invention produces the same result as the execution of an algorithm such as A*, that is to say, an optimal path from the starting vertex 12 to the destination vertex 14 given the obstacles present. The reference length of this path is labeled $L_A$ and its value is arbitrarily set to 100.

Figure 5B:
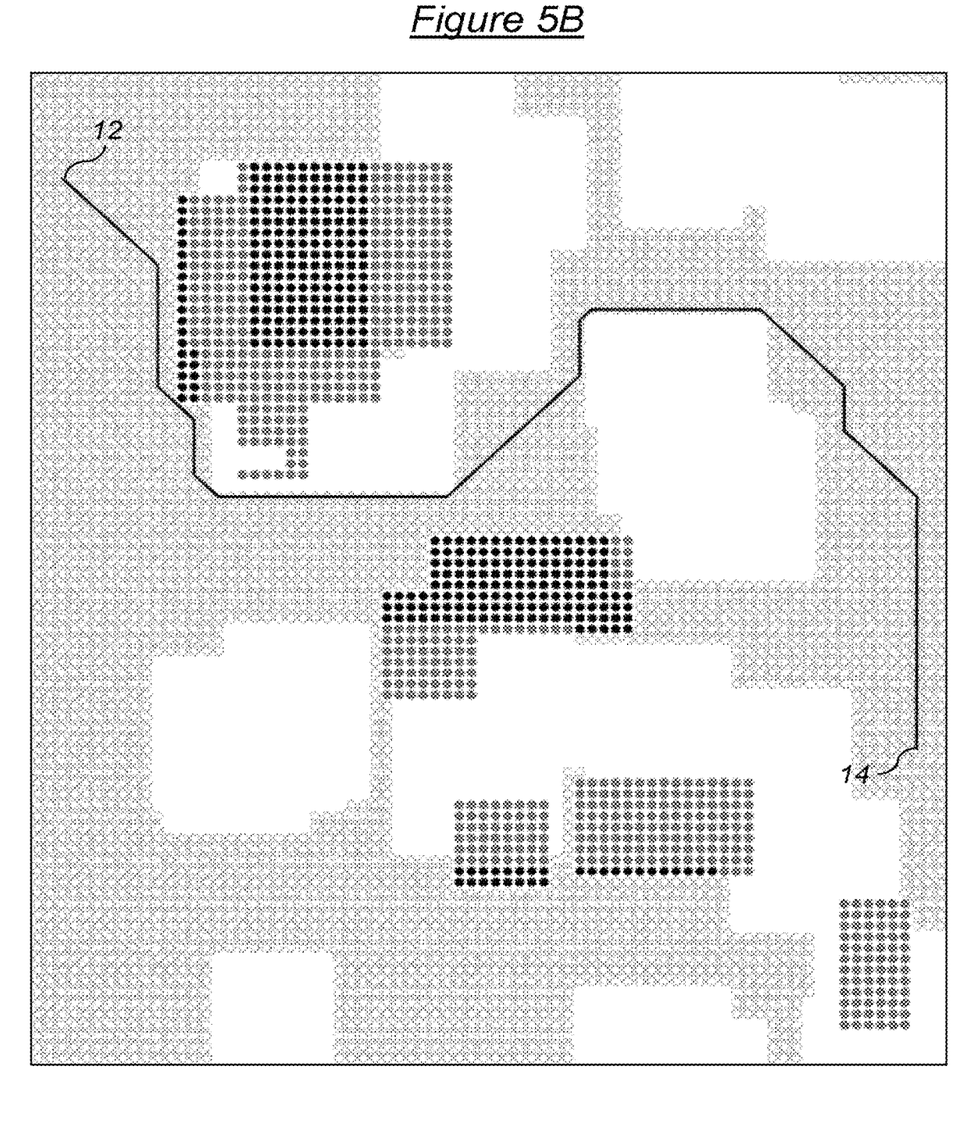

FIG. 5B illustrates the result of the execution of a method for controlling the moving agent 16 that uses a planning algorithm such as A* and carries out non-exploratory navigation, in the same environment as that of FIG. 5A, this environment, however, now being only partially represented by a directed graph. The known pixels that can be crossed are shown in light gray and those that are known and form an obstacle are shown in black. Moreover, the pixels of the unknown portion U that can be crossed are shown in white and those that are in the unknown portion U and form an obstacle are shown in medium gray. In this case, the execution of a method such as the A* algorithm, produces a non-optimal path that does not go into the unknown portion U. In this example, the length $L_B$ of the path found and followed by the moving agent 16 between the starting vertex 12 and the destination vertex 14 is approximately 135.

Figure 5C:
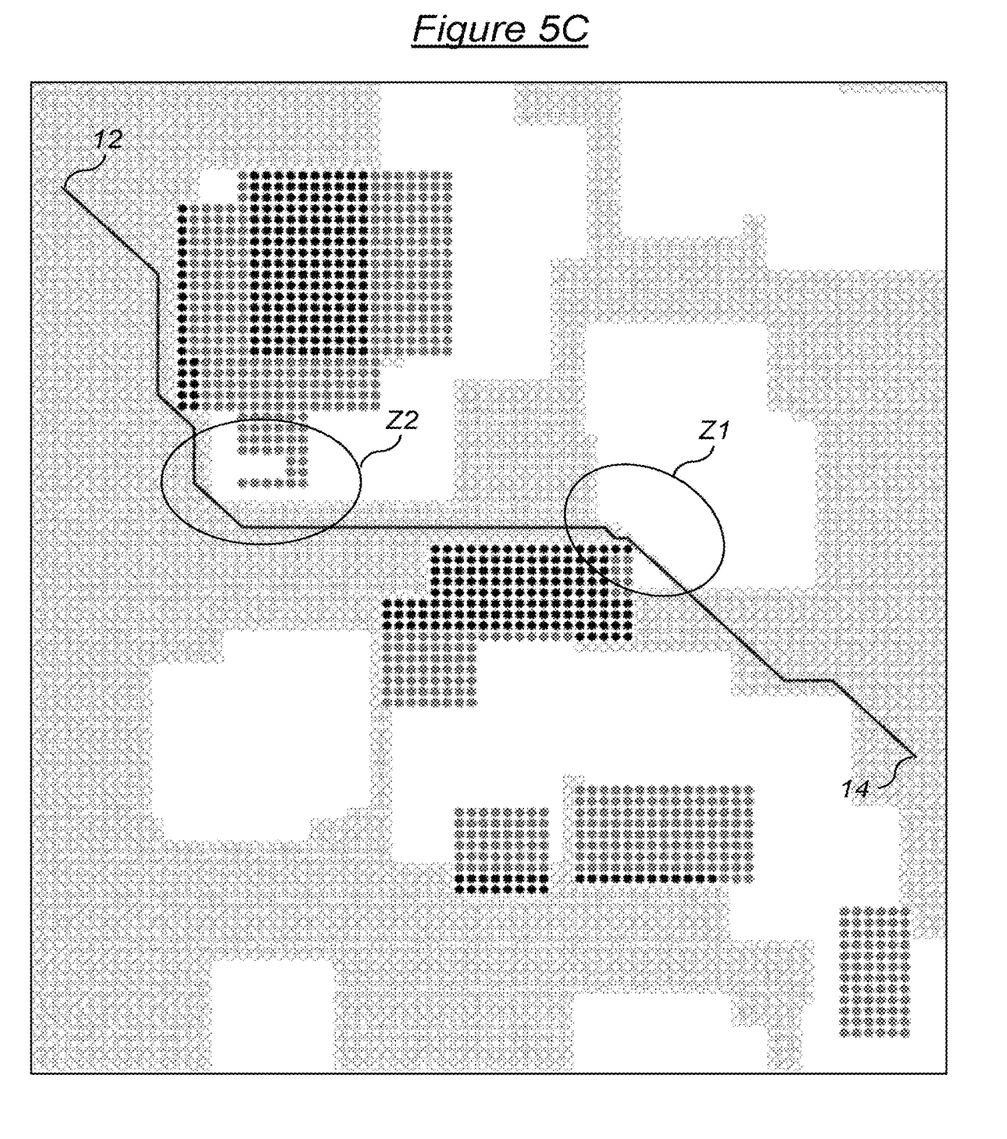

FIG. 5C illustrates the result of the execution of a method for controlling the moving agent 16 according to the invention, such as that of FIGS. 3 and 4, in the same environment partially represented by a directed graph as that of FIG. 5B. In this case, and on the basis of a certain risk heuristic chosen, the execution of a method according to the invention produces a path close to the optimal path that goes (zone Z1) or does not go (zone Z2) into the unknown portion U. In this example, the length $L_c$ of the path found and followed by the moving agent 16 between the starting vertex 12 and the destination vertex 14 is approximately 102.

It should be noted in particular that the zone Z2 is not explored, probably because the potential gain in optimality of the path if this zone were explored is largely compensated for by the risk run in exploring this zone. For that matter, it can be noted that in the example illustrated, such an exploration of the zone Z2 would very certainly lead to the moving agent 16 following the dead end of the obstacle partially present in the unknown portion U. This is a trap that the implementation of a method according to the invention can avoid, as opposed to the PHA* solution that would inevitably fall into this trap via its systematic exploration from which the notion of risk is absent.

It is clear that a system/method for controlling a movement of a moving agent, in an environment partially represented by a directed graph, such as that described above allows exploratory navigation to be carried out by implementing a controlled tradeoff, related to the management of a risk defined specifically via heuristics and which can be adapted to the desired context, between a planned navigation without exploration and a navigation in which the exploration is too systematic. Only the exploration strictly necessary for the navigation is carried out.

In particular, a method such as the one that has been detailed above allows efficient navigation to be carried out even if no path is initially known between a starting point and a destination point during the planning. The planning time can in particular be optimized if it is compared to the time of a planning according to A* followed by any exploration.

It further allows any exploration before planning to be eliminated by merging the navigation with the exploration.

Finally, it is suitable for the uses in which, even if a complete graphic representation of the environment in which the moving agent moves is theoretically possible, it is only incomplete in practice for reasons of minimum use of the storage means (limited memory card, data compression, etc.).

There are multiple uses:
  in mobile robotics, in particular in contexts of simultaneous cartography and location or in contexts of secure investigation in a hostile environment,
  in the automobile industry, for the design of smart vehicles,
  in conventional routing for the transmission of data through complex and/or expandable networks, for example expandable networks of connected objects,
  for the search for paths in semantic databases,
  etc.

The choice of an efficient risk heuristic depends on the intended use and the corresponding problem to be solved.

It should also be noted that the invention is not limited to the embodiment described above. It is clear to a person skilled in the art that various modifications can be made to it in light of the teaching that is disclosed above. In the following claims, the terms used must not be interpreted as limiting the claims to the embodiment disclosed in the present description, but must be interpreted to include all the equivalents that the claims intend to cover due to their wording and the provision of which is within the reach of a person skilled in the art when applying general knowledge to the implementation of the teaching that has just been disclosed above.

The invention claimed is:

1. A method for controlling a movement of a moving agent moving within an environment organized into a network of nodes and links between the nodes partially represented by a directed graph, wherein each vertex and edge of the directed graph corresponds respectively to a node and to an orientation of a link of the network, wherein the directed graph initially includes a plurality of border vertices, from each of which at least one edge is directed towards an unknown portion of the network not represented by the directed graph, the method comprising:

guiding, by a processor, the moving agent in its movement, between a starting vertex and a destination vertex in the directed graph, via execution of at least one iteration of the following successive operations:

planning a path in the directed graph, between a vertex at which the moving agent is located and the destination vertex or a border vertex, via execution of a path-searching algorithm based on a first heuristic evaluation of cost calculated for vertices of the directed graph and based on a path search via a progressive increase in cost;

controlling a navigation of the moving agent between a location at which it is located and the destination vertex or the border vertex returned by the planning; and after the navigation and when the planning returns a border vertex that is different from the destination vertex, controlling an exploration in the unknown portion of the network with enrichment of the directed graph via addition of the vertex or vertices and at least one edge explored;

wherein the planning of each iteration comprises, for each calculation of the first heuristic evaluation of cost for a border vertex, an additional calculation of a second heuristic evaluation of risk for this border vertex, and provides, as the destination of the path, the border vertex for which the heuristic evaluation of risk calculated is lowest as soon as the cost exceeds this lowest heuristic evaluation of risk before the destination vertex has been reached.

2. The method for controlling the movement of the moving agent as claimed in claim 1, wherein the planning of each iteration is executed based on an implementation of an algorithm in which the first heuristic evaluation of cost is defined, for each considered vertex of the directed graph for which the evaluation is calculated, as a sum of a minimum cost for going from the vertex at which the moving agent is located to the considered vertex by navigating in the directed graph and a heuristic estimation of minimum cost for going from the considered vertex to the destination vertex.

3. The method for controlling the movement of the moving agent as claimed in claim 2, wherein the heuristic estimation of minimum cost is a distance expressed via Euclidean norm between the considered vertex and the destination vertex.

4. The method for controlling the movement of the moving agent as claimed in claim 2, wherein the second heuristic evaluation of risk is defined, for each considered border vertex of the directed graph for which the evaluation is calculated, as the sum of a minimum cost for going from the vertex at which the moving agent is located to the considered border vertex by navigating in the directed graph and a heuristic estimation of overestimated cost for going from the considered border vertex to the destination vertex.

5. The method for controlling the movement of the moving agent as claimed in claim 4, wherein the heuristic estimation of overestimated cost corresponds to the heuristic estimation of minimum cost weighted by a multiplication coefficient greater than or equal to "1".

6. The method for controlling the movement of the moving agent as claimed in claim 5, wherein the multiplication coefficient is variable during navigation or between two operations of navigations.

7. The method for controlling the movement of the moving agent as claimed in claim 5, wherein the heuristic estimation of overestimated cost is further weighted by an additional multiplication coefficient defined based on an angular value expressed with respect to a reference direction of an axis connecting the considered border vertex to the destination vertex, wherein this additional multiplication coefficient is more specifically defined to penalize any navigation in a direction that moves away from the reference direction.

8. The method for controlling the movement of the moving agent as claimed in claim 1, wherein at least one semantic rule defined according to application needs is introduced into the second heuristic evaluation of risk.

9. The method for controlling the movement of the moving agent as claimed in claim 1, wherein the exploration of each iteration is carried out until any vertex of the directed graph is again reached.

10. The method for controlling the movement of the moving agent as claimed in claim 1, wherein the successive operations are repeated until the destination vertex is reached or the planning is blocked at the vertex at which the moving agent is located.

11. A non-transitory computer-readable storage medium including computer executable instructions, wherein the instructions, when executed by a computer, cause the computer to perform a method for controlling a movement of a moving agent moving within an environment organized into a network of nodes and links between the nodes partially represented by a directed graph, wherein each vertex and edge of the directed graph corresponds respectively to a node and to an orientation of a link of the network, wherein the directed graph initially includes a plurality of border vertices, from each of which at least one edge is directed towards an unknown portion of the network not represented by the directed graph, the method comprising:

guiding the moving agent in its movement, between a starting vertex and a destination vertex in the directed graph, via execution of at least one iteration of the following successive operations:

planning a path in the directed graph, between a vertex at which the moving agent is located and the destination vertex or a border vertex, via execution of a path-searching algorithm based on a first heuristic evaluation of cost calculated for vertices of the directed graph and based on a path search via a progressive increase in cost;

controlling a navigation of the moving agent between a location at which it is located and the destination vertex or the border vertex returned by the planning; and after the navigation and when the planning returns a border vertex that is different from the destination vertex, controlling an exploration in the unknown portion of the network with enrichment of the directed graph via addition of the vertex or vertices and at least one edge explored;

wherein the planning of each iteration comprises, for each calculation of the first heuristic evaluation of cost for a border vertex, an additional calculation of a second heuristic evaluation of risk for this border vertex, and provides, as the destination of the path, the border vertex for which the heuristic evaluation of risk calculated is lowest as soon as the cost exceeds this lowest heuristic evaluation of risk before the destination vertex has been reached.

12. A system for controlling a movement of a moving agent moving within an environment organized into a network of nodes and links between the nodes partially represented by a directed graph, wherein each vertex and edge of the directed graph corresponds respectively to a node and to an orientation of a link of the network, wherein the directed graph initially includes a plurality of border vertices, from each of which at least one edge is directed towards an unknown portion of the network not represented by the directed graph, the system comprising:

a guide processor configured to guide the moving agent in its movement, between a starting vertex and a destination vertex in the directed graph, via execution of at least one iteration of the following successive operations:

planning a path in the directed graph, between a vertex at which the moving agent is located and the destination vertex or a border vertex, via execution of a path-searching algorithm based on a first heuristic evaluation of cost calculated for vertices of the directed graph and based on a path search via a progressive increase in cost, controlling a navigation of the moving agent between a location at which it is located and the destination vertex or the border vertex returned by the planning, and after the navigation and when the planning returns a border vertex that is different from the destination vertex, controlling an exploration in the unknown portion of the network with enrichment of the directed graph via addition of the vertex or vertices and at least one edge explored, wherein the planning of each iteration comprises, for each calculation of the first heuristic evaluation of cost for a border vertex, an additional calculation of a second heuristic evaluation of risk for this border vertex, and provides, as the destination of the path, the border vertex for which the heuristic evaluation of risk calculated is lowest as soon as the cost exceeds this lowest heuristic evaluation of risk before the destination vertex has been reached.

* * * * *